June 24, 1941.  D. S. BOND  2,247,048
RADIO NAVIGATION EQUIPMENT
Filed July 30, 1938  2 Sheets—Sheet 2
F/G.2.
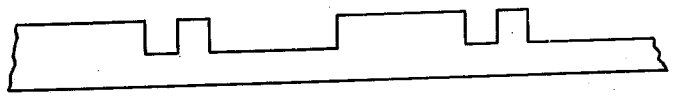
F/G.2a.
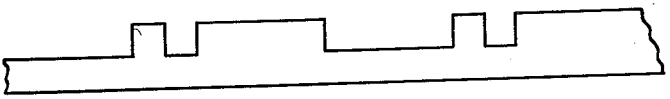
F/G.2b.
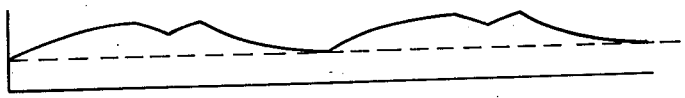
F/G.2c.
F/G.2d.
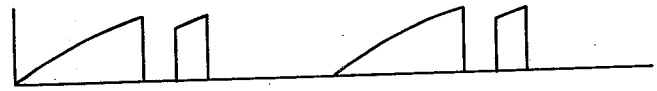
F/G.2e.
F/G.2f.
F/G.2g.
Inventor
Donald S. Bond
By
Attorney Patented June 24, 1941

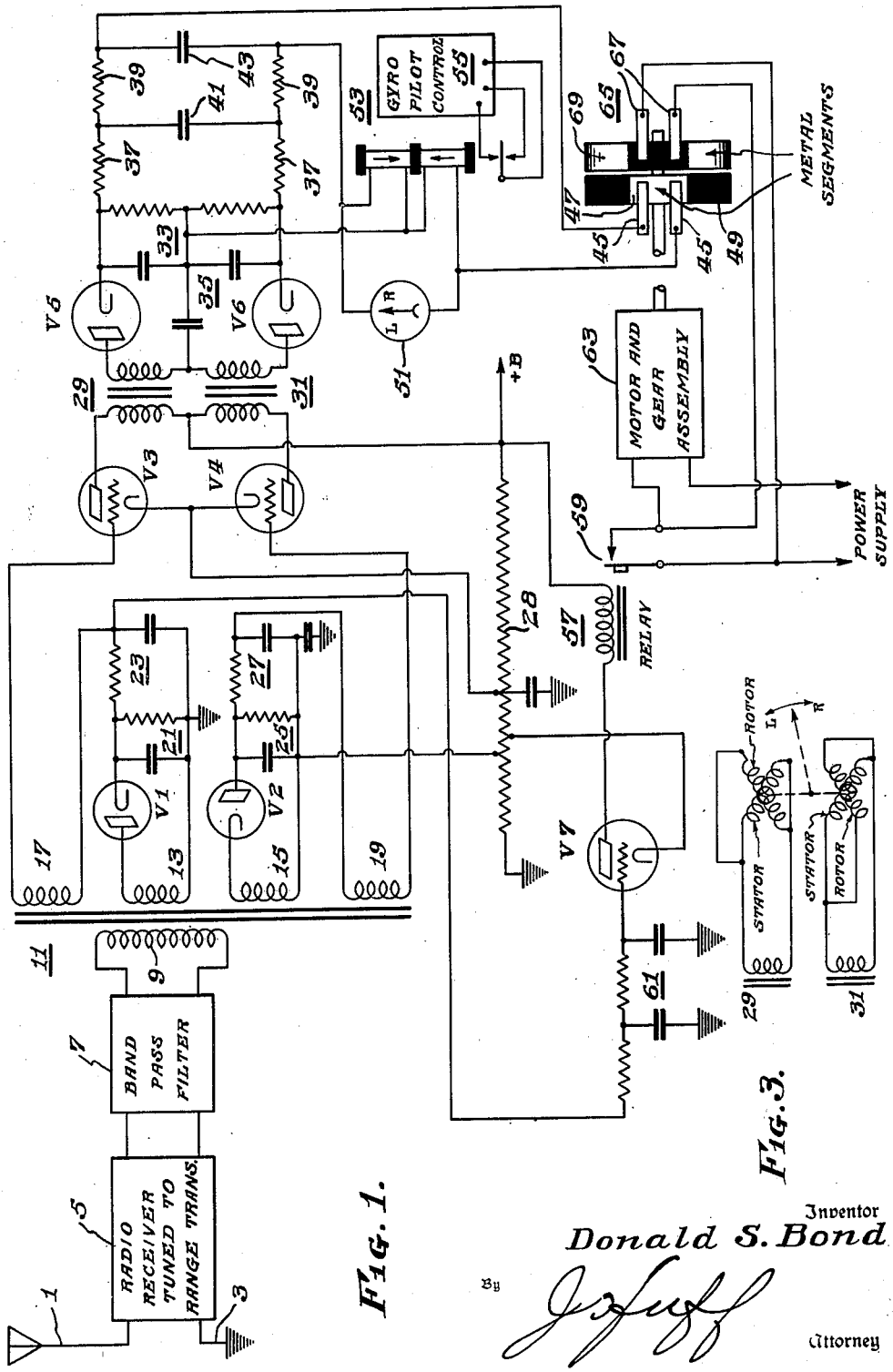

2,247,048

UNITED STATES PATENT OFFICE 2,247,048

RADIO NAVIGATION EQUIPMENT

Donald S. Bond, Philadelphia, Pa., assignor to Radio Corporation of America, a corporation of Delaware Application July 30, 1938, Serial No. 222,084

9 Claims. (Cl. 250—11)

This invention relates to radio apparatus used in navigation and more especially to radio apparatus for indicating the bearing of a craft with respect to a prescribed course or for automatically keeping such craft on a predetermined course.

Aircraft navigation in the United States has been accomplished to a considerable extent by making use of radio courses. In the system now used, radio courses for aircraft are established by radio ranges. These radio ranges radiate modulated signals in different directions. The fields thus radiated in different directions have overlapping portions in which equi-signal paths are established. These paths are indicated to the pilot by aural signals of the interlocked "A—N" type. On either side of the course the A or the N signal will predominate, while on the course a continuous dash signal is heard. It is customary to interrupt the dash signal for transmission of range identifying signals.

While "A—N" signals are satisfactory for headphone reception, there are occasions when visual signals are preferred. Furthermore, in some instances, it may be desirable to apply the signals whereby servo-mechanisms automatically control the rudders of aircraft and thus automatically maintain such craft on the preferred course.

Mention is made of U. S. Patent No. 1,949,256, which issued to Kramar. In this patent a system is disclosed for converting E—T or dot-dash signals into visual signals. In such event, there is no difficulty in the conversion because of the inherent difference in energy between a dot or a dash. In the present invention the directional signal differentiation is made notwithstanding the substantial equality of energy in the original telegraphic signals.

It is one of the objects of this invention to provide means for converting an interlocked telegraphic signal, representing similar energy contents, into direct currents having a polarity dependent upon the predominating signal. It is an additional object to provide means for converting the "A—N" signals of radio range into visual signals indicating departures to the left or right of a preferred course. It is an additional object of this invention to provide means for automatically controlling the direction of movement of a craft as a function of the radio signals received along a preferred course. It is a still further object to provide means for preventing radio range identifying signals from operating the course indicating and course controlling apparatus.

The invention will be described by reference to the accompanying drawings in which Figure 1 is a schematic circuit diagram representing one embodiment of the invention;

Figures 2, 2a, 2b, 2c, 2d, 2e, 2f and 2g are graphic illustrations of the wave forms utilized in applying the invention, and Figure 3 illustrates a dynamometer type indicator.

Referring to Fig. 1, an antenna 1 and a ground or counterpoise 3 are connected to the input of a radio receiver 5. The receiver may be a radio frequency amplifier, superheterodyne or the like, tunable to the frequency of the radio range. The output of the receiver 5 is preferably connected through a bandpass filter 7 which transmits currents of the modulation frequency to the primary 9 of an audio frequency transformer 11. The audio transformer 11 includes two pairs 13—15 and 17—19 of secondary windings. The first pair of windings 13—15 are connected to rectifiers V1, V2, respectively. The rectifier circuits include networks of capacity and resistance 21, 23, 25, 27. The values of capacitance and resistance are chosen to provide suitable time constants as will hereinafter be described. It will be seen that the rectifiers are oppositely poled with respect to the biases derived therefrom.

The networks 21, 25 are grounded and the junctions of the resistor and capacitor 23, 27 are connected respectively to terminals of the secondary windings 17, 19. The remaining terminals of these windings are connected respectively to the grid electrodes of a pair of amplifying tubes V3, V4. Thus opposite biases derived from the rectifiers V1, V2 are applied to the grids of the amplifying tubes. In addition to the derived biases, the grids of the amplifiers V3—V4 have applied thereto different initial biases which are obtained from the connections to the potentiometer 28. The difference in the initial biases is an aid in producing the asymmetrical currents required to convert the telegraphic into direct currents of the desired polarity. The output circuits of the amplifiers V3, V4 are coupled through transformers 29, 31, to a second pair of rectifiers V5, V6. Each of the second rectifiers V5, V6 include filters 33, 35 and across the filters 33, 35 is arranged an additional filter comprising resistors 37, 39 and capacitors 41, 43. The output of the filter 37, 39, 41, 43 is connected through brushes 45 and a conductive segment 47 on a commutator 49. The purpose of the commutator will be hereinafter described.

The output circuit, after passing through the commutator section, includes a left-right indicating meter 51 and a differential relay 53. The central point of the differential relay is connected to the junction of the filters 33, 35. The relay contacts are connected to the gyro pilot control 55. Since the gyro pilot control is not a part of this invention and is well known to those skilled in the art, no detailed description is necessary. It is sufficient to say that the gyro pilot controls the course of the craft carrying the device.

Inasmuch as radio ranges generally include telegraphic identifying signals which are sent at frequent intervals, it is desirable to provide means for eliminating any interference which such signals might cause. To this end, a relay tube V7 is connected so that when signals are present, plate current will flow through a relay 57. The relay includes contacts 59 which are normally open, i. e., the plate current keeps the relay contacts open during the "A—N" range signalling. The input circuit of the relay tube V7 is connected through a filter 61 to the rectifier V1. When the rectifier V1 is operated by steady "A—N" signals, the relay V7 is positively biased to maintain the contacts 59 open. When the interlocked "A—N" range signals are interrupted, prior to the transmission of the identifying signals, the positive bias on the grid of the relay V7 is diminished to such an extent that the plate current through the relay 57 is diminished or cut off, thereby permitting the contacts 59 to close. This starts the motor and gear assembly 63 in motion and thereby drives the commutators 49 and 65 through a complete revolution which is timed for an interval preferably just exceeding the time required to transmit the identifying signals.

Once the commutator 65 has moved to a point at which the brushes 67 are connected, chattering of the relay 59 is prevented by the short circuit which is applied through the brushes 67 and the conductive portion 69 of the commutator 65. During the same time the contact through the brushes 45 and the conductor 47 is open, thereby open circuiting the left-right indicator and gyro pilot control. Opening the indicator and the gyro pilot control prevents undesired operation which might be affected by the identifying signals instead of the intended operation by the course signals.

The principles of operation of the invention will be described by reference to Figs. 2, 2a, etc. Fig. 2 is intended to represent graphically a radio range signal in which the N predominates. Fig. 2a represents a radio range signal in which the A predominates. The predominating signals are applied to the rectifiers V1, V2. If the time constants of the filter networks 21, 23, 25, 27 are properly chosen, a bias signal will be derived from the predominating N signal to correspond to the wave form indicated in Fig. 2b. If the A signal predominates the rectified wave form will correspond to the graph of Fig. 2c. It will be observed that these biases are asymmetrical. The dash lines indicate the bias required for cut-off. The predominating bias is applied inversely to the grid circuits of the amplifiers V3—V4 so that the amplification of one of these tubes will exceed that of the other, depending upon whether the bias is derived from the predominating A or N signal. Therefore, the output signal of tube V3 will correspond to the graph of Fig. 2d for a predominating N signal and will correspond to the graph of Fig. 2e for a predominating A signal. At the same time the output of tube V4 will correspond to the graph of Fig. 2f for a predominating N signal and will correspond to the graph of Fig. 2g for a predominating A signal. If the area of the graph of Fig. 2d is subtracted from the area of the graph of Fig. 2f it will be seen that the former predominates. Thus, for a predominating N signal the energy in the output of tube V3 predominates over the energy in the output of tube V4.

Likewise, if the area of the graph of Fig. 2e is subtracted from the area of the graph of Fig. 2g, it will be seen that the latter predominates. Furthermore, it will be seen that the tube V4 has the predominating output for a predominating A signal. Since the areas of these graphs represent the energy applied to the rectifiers V5 and V6, it will be seen that the rectified currents in V5 will predominate over V6 or vice versa if either the N or the A signal predominates. This will result in an unbalance which will move the indicator of the meter 51 to the left or the right, as the case may be, or will drive the relay 53 to make a contact corresponding to the predominating signal. In the event that neither the A nor the N signal predominates, the rectified currents and the amplified currents of all of the tubes will be equal and opposite. Under these conditions there will be no unbalance and the indicator and the differential relay will remain in a neutral or "on course" position.

Thus, the invention has been described as a radio navigation device in which radio range signals of telegraphic character are converted into visual or automatic control signals. It should be understood that the additional circuit employing the relay tube V7, relay 57 and motor control 63 may be omitted if the user is content to put up with the erratic operation which might be caused by the identifying signal.

It should also be understood that in place of the motor 63 and commutators 49, 65, a relay using a dash pot or the equivalent may be substituted.

While the invention has been described by referring to A—N signals, it should be understood that range signals may include any interlocked complementary signals. Likewise, the use of amplifiers V3, V4 and subsequent rectifiers V5, V6 is not essential, if sufficient differentiation is obtained in the initial rectification by tubes V1, V2 and their associated time constant networks as shown in graphs Figs. 2b and 2c. A dynamometer may be substituted for the rectifiers V5, V6, bridge circuit 37, 39, 41, 43 and relay 53, as shown in Fig. 3. The dynamometer should be damped to prevent oscillations of the indicator. The dynamometer may operate air valves in the gyro pilot control.

I claim as my invention:

1. In a system for converting predominating aural radio range telegraphic signals into visual signals, a source of alternating currents bearing telegraphic signals of different sequence and equal energy contents, a pair of amplifiers effectively connected to said source for amplifying said currents, means for varying the relative gain of each amplifier of said pair as a function of the amplitude of the predominating signal, means for rectifying said amplified signals, and means for indicating any unbalance in said rectified signals.

2. The method of converting the predominating radio signals of a pair of radio range telegraphic course signals into visual signals corresponding to the predominating course signal which includes receiving said radio signals, converting said signals into alternating currents bearing said course signals, rectifying said alternating current signals to produce a pair of asymmetrical currents, amplifying said alternating current course signals, varying the degree of said amplification as a function of said symmetric currents, rectifying the amplified alternating current course signals whose amplification is a function of said amplified asymmetrical currents, and visually indicating the asymmetry of the last mentioned rectified currents.

3. The method of converting the predominating course signal of a pair of radio range telegraphic course signals into visual signals corresponding to the predominating course signal which includes receiving said radio signals, converting said signals into alternating currents bearing said course signals, rectifying said alternating current signals to produce a pair of asymmetrical currents, amplifying said alternating current course signals, varying the degree of said amplification as a function of said asymmetric currents, and visually indicating the asymmetry of said last mentioned rectified currents.

4. In a system for converting aural radio range telegraphic signals of equal energy contents but of different sequence forming radio courses of the "A—N" type and at intervals bearing identifying signals into visual signals and for rendering said conversion ineffective during transmission and reception of range identifying signals, means for receiving said radio range course and identifying signals and having an output including currents corresponding to said signals, a pair of rectifiers connected to said output, filters connected to said rectifiers, means connected to said filters and adapted to convert signals of equal energy contents but of different sequence into direct currents representing said different sequence, means for indicating unbalance in said last mentioned currents, and means for preventing range identifying signals from operating said indicating means.

5. In a system for converting predominating aural radio range telegraphic alternate course and identifying signals into visual signals and for rendering said visual signals ineffective during the interval corresponding to the transmission and reception of range identifying signals, a receiver responsive to said range signals and having an output including currents corresponding to telegraphic signals of different sequency and equal energy contents, a pair of amplifiers effectively connected to said output for amplifying said currents, means for varying the relative gain of each amplifier of said pair as a function of the amplitude of the predominating signal, means for rectifying said amplified signals, means for indicating any unbalance in said rectified signals, and means for automatically preventing the operation of said indicating means during the interval when said alternating currents bear range identifying signals.

6. In a system for converting predominating aural radio range telegraphic alternate course and identifying signals into visual signals and for rendering said conversion ineffective during the interval for the transmission and reception of range identifying signals, a receiver responsive to said radio range course and identifying signals and having an output including alternating currents corresponding to the predominating range signal and to the identifying signal, a pair of amplifiers connected to said output for amplifying said currents, means for varying the relative gain of each amplifier of said pair as a function of the amplitude of the predominating signal, means for indicating any unbalance in said amplified signals, and means for automatically preventing the operation of said indicating means during the interval when said alternating currents bear range identifying signals.

7. The method of converting aural radio range telegraphic signals alternately identifying the range and indicating courses by characteristic radio signal currents into direct currents having a polarity dependent upon the predominating of the characteristic course signals and for rendering said conversion ineffective during the intervals corresponding to the transmission and reception of range identifying signals which comprises receiving said radio currents bearing range and identifying signals, demodulating said currents, rectifying said demodulated currents, delaying said rectified currents for intervals relatively long compared to said signals whereby asymmetrical currents are derived, indicating the polarity of the predominating asymmetrical current, and interrupting the indication of said polarity during intervals corresponding to the transmission of range identifying signals.

8. The method of converting aural radio range telegraphic signals identifying the range of intervals and at other times indicating courses by characteristic radio signal currents into direct currents having a polarity dependent upon the predominating of the characteristic course signals and for rendering said conversion ineffective during the intervals corresponding to the transmission and reception of range identifying signals which comprises receiving said radio signals bearing range and identifying signals, converting said signals into alternating currents bearing said course signals, rectifying said alternating current signals to produce a pair of asymmetrical currents, amplifying said alternating current course signals, varying the degree of said amplification as a function of said asymmetric currents, rectifying the amplified alternating current course signals whose amplification is a function of said amplified asymetrical currents, visually indicating the asymmetry of the last mentioned rectified currents, and interrupting said visual indication during intervals coresponding to the transmission of range identifying signals.

9. The method of converting aural radio range telegraphic signals alternately identifying the range and indicating courses by characteristic radio signal currents into direct currents having a polarity dependent upon the predominating of the characteristic course signals and for rendering said conversion ineffective during intervals corresponding to the transmission and reception of range identifying signals which comprises receiving said radio signals bearing said course and identifying signals, converting said radio signals into alternating currents bearing said course signals, rectifying said alternating current signals to produce a pair of asymmetrical currents, amplifying said alternating current course signals, varying the degree of said amplification as a function of said asymmetric currents, visually indicating the asymmetry of said last mentioned rectified currents, and interrupting said visual indication during intervals corresponding to the transmission of range identifying signals.

DONALD S. BOND.